(12) United States Patent
Lin

(10) Patent No.: US 7,938,628 B2
(45) Date of Patent: May 10, 2011

(54) COMPOSITE-STEEL HYBRID MAST FOR ROTORCRAFT

(75) Inventor: Sherman S. Lin, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 163 days.

(21) Appl. No.: 12/377,007

(22) PCT Filed: Aug. 15, 2007

(86) PCT No.: PCT/US2007/076011
§ 371 (c)(1),
(2), (4) Date: Feb. 10, 2009

(87) PCT Pub. No.: WO2008/022201
PCT Pub. Date: Feb. 21, 2008

(65) Prior Publication Data
US 2010/0166568 A1    Jul. 1, 2010

(51) Int. Cl.
*B64C 7/00*    (2006.01)
(52) U.S. Cl. ........................................ 416/248; 416/500
(58) Field of Classification Search ............... 415/216.1; 416/248, 500; 29/889.2; 473/319–321
See application file for complete search history.

(56) References Cited

U.S. PATENT DOCUMENTS

| | | | | |
|---|---|---|---|---|
| 3,937,412 A * | 2/1976 | Damour | ..................... | 242/571.1 |
| 4,272,971 A * | 6/1981 | Loyd et al. | ..................... | 464/181 |
| 4,421,497 A * | 12/1983 | Federmann et al. | .......... | 464/181 |
| 4,834,693 A * | 5/1989 | Profant et al. | ................ | 464/183 |
| 5,607,364 A * | 3/1997 | Hedrick et al. | ............... | 473/318 |
| 6,336,986 B1 * | 1/2002 | Lee et al. | ...................... | 156/172 |
| 6,805,642 B2 * | 10/2004 | Meyer | ........................... | 473/320 |
| 2002/0023335 A1 | 2/2002 | Jervant et al. | | |

FOREIGN PATENT DOCUMENTS

CN    1101898 C    3/2003

OTHER PUBLICATIONS

First Office Action in CN counterpart Application No. 200780030436.3, issued by Patent Office of China, Apr. 22, 2010.

* cited by examiner

*Primary Examiner* — Ninh H Nguyen
(74) *Attorney, Agent, or Firm* — James E. Walton

(57) ABSTRACT

A composite-steel hybrid mast for a rotorcraft includes a tubular, steel portion having an internal surface defining a space therein and a composite portion disposed within the space defined by the internal surface of the steel portion and held in a fixed spatial relationship with respect to the internal surface of the steel portion.

16 Claims, 5 Drawing Sheets

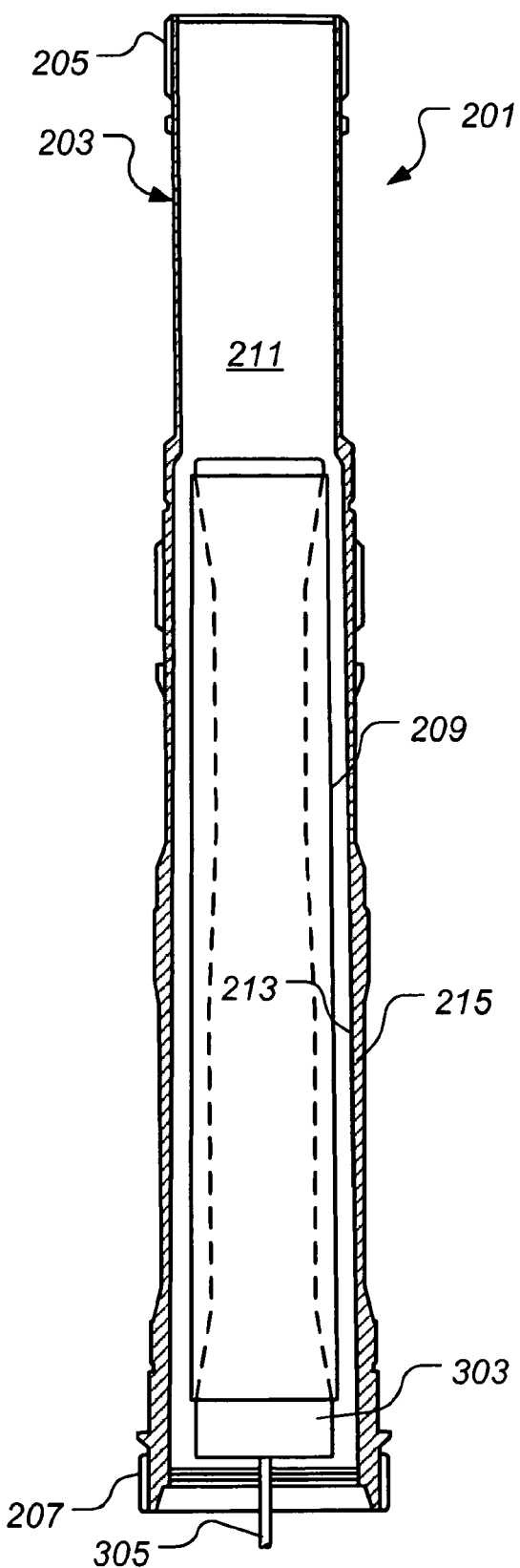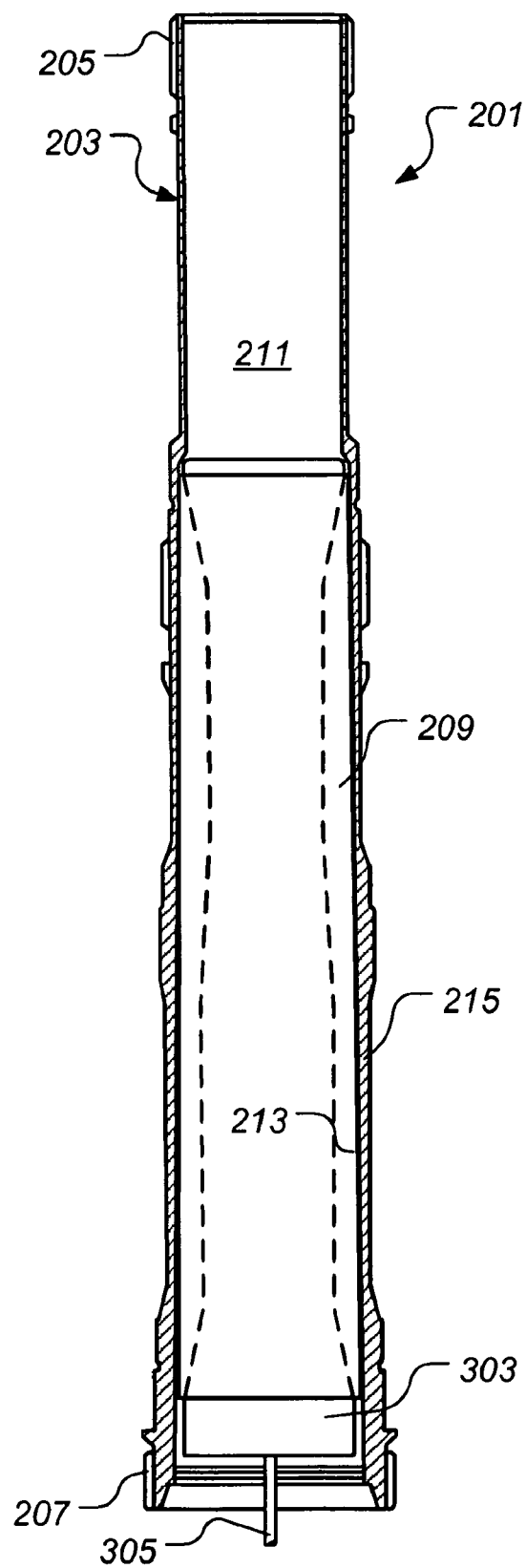
*FIG. 4*  *FIG. 5*

COMPOSITE-STEEL HYBRID MAST FOR ROTORCRAFT

TECHNICAL FIELD

The present invention relates to masts for rotorcraft.

DESCRIPTION OF THE PRIOR ART

Traditional rotorcraft masts are fabricated from a steel forging, which typically comprises 4340 steel, 9310 low-alloy steel, or nitriding steel, such as nitralloy steel. All interfacing features are machined on the outside surface of the mast. These include splines for engaging with a planetary carrier in the rotorcraft's gearbox and a trunion of the rotor hub, bearing raceways, spinner support, etc.

For example, as shown in FIG. 1, a conventional steel mast 101 for rotorcraft (not shown) comprises an elongated tubular structure having an external wall 103 made of steel. Mast 101 typically includes one or more end fittings 105 and 107 that allow mast 101 to be connected to the transmission, the rotor hub, and other components of the rotorcraft (not shown).

A major section of the mast is exposed to the environment with minimum protection outside of the gearbox. This section is critically loaded while being susceptible to various kinds of damaging elements, such as debris blasts, sand blasts, chemical corrosion, and handling damage. All of these damaging elements may result in dangerous cracking on the mast surface. Because conventional masts are mission critical parts with no redundant or "fail-safe" structures, the failure of a mast may very likely result in the loss of lives and property.

Although great strides have been made in the area of rotorcraft masts, significant shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIGS. 3-7 depict one particular, illustrative embodiment of a method for making the composite-steel hybrid masts of FIG. 2 or FIG. 8.

Figure 1:
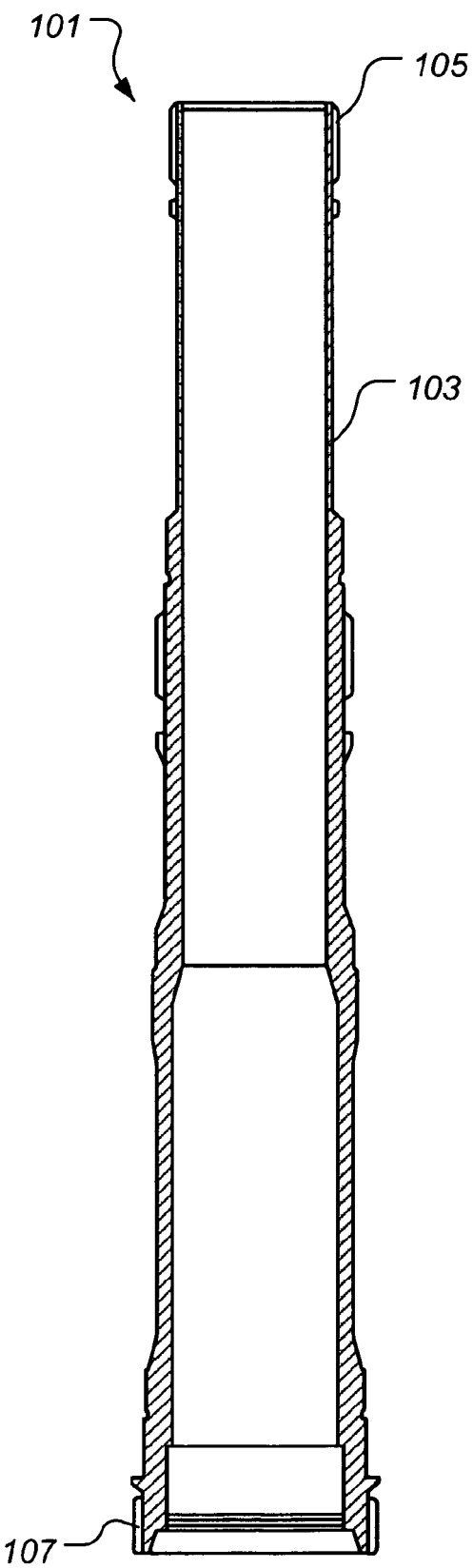
FIG. 1 is a longitudinal, cross-sectional view of a conventional steel mast for a rotorcraft.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

A composite-steel hybrid mast for a rotorcraft includes a tubular, steel portion having an internal surface defining a space therein and a composite portion disposed within the space defined by the internal surface of the steel portion and affixed to the internal surface of the steel portion.

A method for making a composite-steel hybrid mast for a rotorcraft includes providing a tubular, steel portion comprising an internal surface defining a space therein; preparing a composite portion comprising a fiber-reinforced, polymeric, composite material on an expandable mandrel; and placing the expandable mandrel, with the composite portion thereon, into the space defined by the internal surface of the steel portion. The method further includes expanding the expandable mandrel, curing the composite portion, unexpanding the expandable mandrel, and removing the expandable mandrel from the composite portion.

Figure 2:
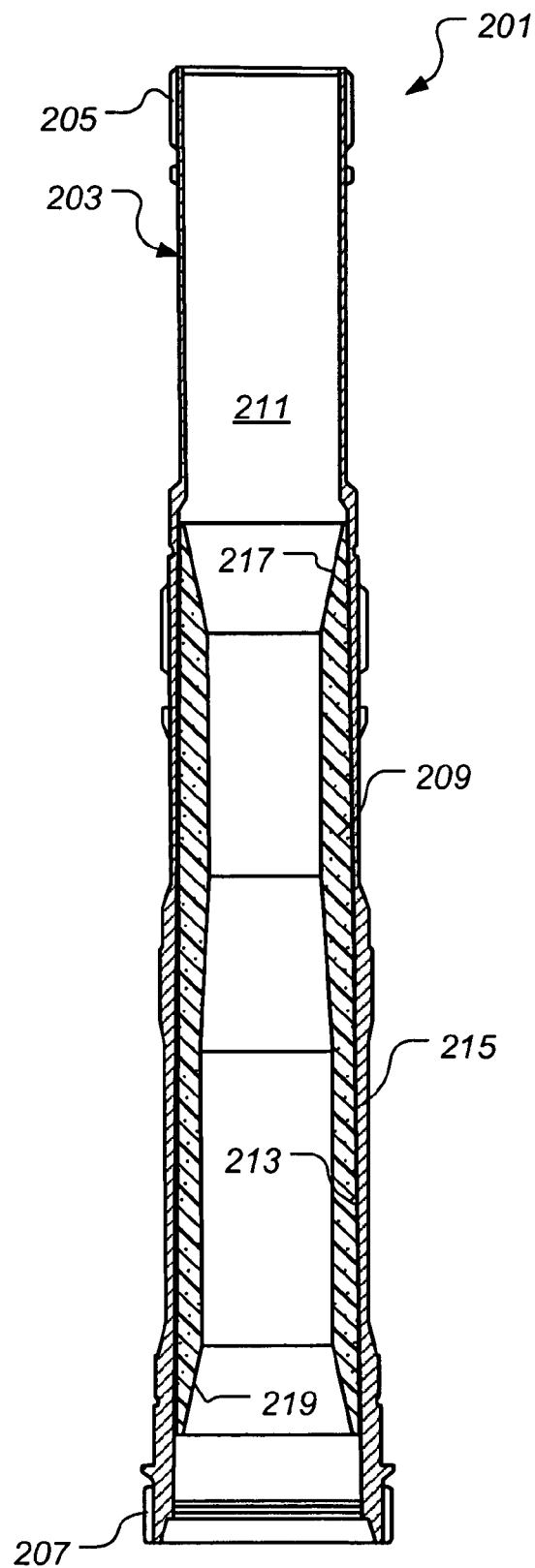
FIG. 2 is a longitudinal, cross-sectional view of an illustrative embodiment of a composite-steel hybrid mast for a rotorcraft.

Referring now to FIG. 2 in the drawings, a preferred embodiment of a composite-steel hybrid mast 201 for a rotorcraft is illustrated. Mast 201 is an elongated coaxial, tubular structure having an external, steel portion 203. Steel portion 203 of mast 201 includes one or more end fittings 205 and 207 that allow mast 201 to be connected to the transmission, the rotor hub, and other components of a rotorcraft (not shown).

In a preferred embodiment, steel portion 203 of mast 201 maintains the same external features, external shape, and external dimensions of a conventional steel mast, such as mast 101 (shown in FIG. 1). However, mast 201 includes an interior composite portion 209 that is made of a fiber-reinforced, polymeric, composite material, such as a carbon-reinforced epoxy material, a fiberglass-reinforced, epoxy material, or the like. Composite portion 209 is disposed within a space 211 defined by steel portion 203 and affixed to an internal surface 213 of external wall 203. Preferably, composite portion 209 is adhesively bonded to internal surface 213 of steel portion 203. Internal surface 213 may include features, such as grooves or slots, such as grooves 301 of FIG. 3, and/or surface treatments, which improve adhesive bonding and load transfer between steel portion 203 and composite portion 209, as is described in greater detail herein.

Still referring to FIG. 2, composite portion 209 allows the thickness of selected portions of steel portion 203 to be reduced over conventional, all-steel masts, such as mast 101, thereby reducing the overall weight of mast 201. Specifically, composite portion 209 allows a thickness of a wall 215 of steel portion 203 to be reduced, as compared to corresponding portions of conventional, all-steel masts, such as mast 101, in areas adjacent composite portion 209. Mast 201 supports torque, thrust, shear, and bending moments.

Interior composite portion 209 may be formed of a fiber-reinforced, composite material fabricated with any process, including, for example, tape-placement; fiber-placement;

filament-winding; braiding and resin transfer molding (RTM), hand layup, or the like.

Figure 3:
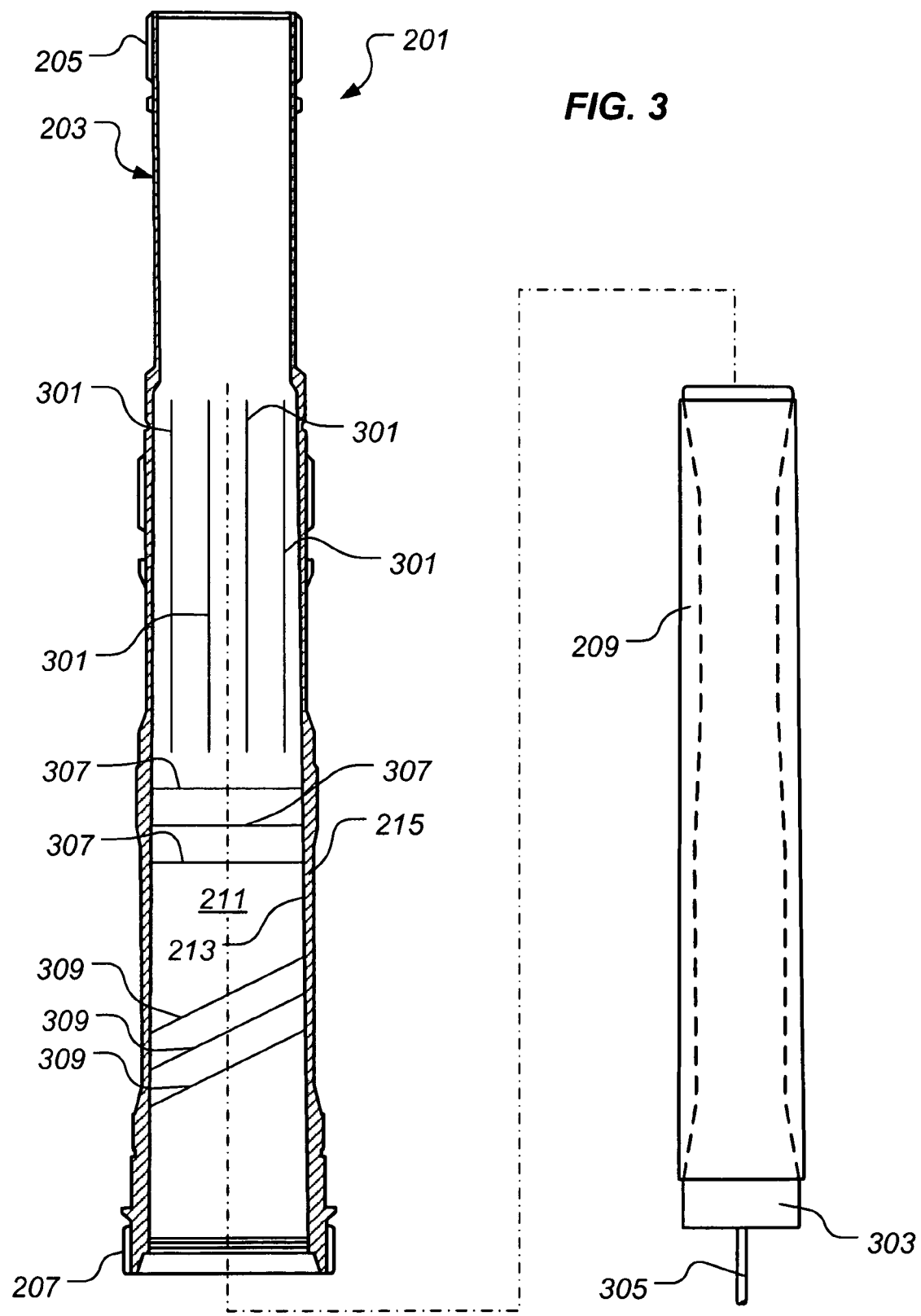

FIGS. 3-5 depict one particular, preferred embodiment of a method for making a composite-steel hybrid mast, such as mast 201. Referring in particular to FIG. 3, a fiber preform 302 of interior composite portion 209 is formed by braiding dry reinforcing fibers around an unexpanded but expandable mandrel 303. In one embodiment, expandable mandrel 303 comprises an elastomeric material configured as a "balloon," such that the elastomeric material defines an internal cavity into which a fluid can be introduced under pressure to inflate expandable mandrel 303. Preferably, however, expandable mandrel 303 is a segmented, metallic, expandable mandrel. It is preferable, but not required, that mandrel 303 have controlled external dimensions. Resin, such as an epoxy resin, is dispersed in fiber preform 302, such as by soaking fiber preform 302 in the resin.

Referring now to FIG. 4, expandable mandrel 303, with fiber preform 302 disposed thereon, is then inserted into steel portion 203 of mast 201. As shown in FIG. 5, expandable mandrel 303 is then expanded toward internal surface 213 of steel portion 203. In one embodiment, expandable mandrel 303 is expanded by introducing a gas, such as air, nitrogen, or the like, into an internal cavity defined by expandable mandrel 303 via a port 305. In another embodiment, expandable mandrel 303 is expanded by mechanically actuating segments of expandable mandrel 303 toward internal surface 213 of steel portion 203. Steel portion 203, fiber preform 302, and mandrel 303 are placed in a resin transfer molding tool 501, represented by a phantom line in FIG. 5, as is known in the art. Resin, such as epoxy resin, is introduced into fiber preform 302 while fiber preform is under vacuum to efficiently transfer resin into fiber preform 302 and to remove gases in fiber preform 302. Resin and fiber preform 302 forms interior composite portion 209. Steel portion 203 and composite portion 209 are then heated to cure the resin of composite portion 209 while composite portion 209 is in contact with internal surface 213 of steel portion 201 to form a rigid composite portion 209 and adhesively bond composite portion 209 to internal surface 213 of steel portion 201. Preferably, the curing operation occurs under vacuum.

It should be noted that the present invention contemplates forming composite portion 209 by methods other than resin transfer molding. For example, reinforcing fibers that are impregnated with resin, known as a composite "prepreg" material, may be placed or "laid-up" on expandable mandrel 303.

It will be appreciated that specialized tools, such as an autoclave, an oven, a gas compressor, a vacuum pump, one or more material handling tools, or the like may be used to facilitate the operation and to complete the curing process. It should also be noted that thermal residual stresses due to the difference in the coefficients of thermal expansion between composite portion 209 and steel portion 203 at the interface between composite portion 209 and inner surface 213 of steel portion 203 and caused by the curing process are always in compression, which inhibits or prevents composite portion 209 from inadvertently becoming dislodged from steel portion 203. Because composite portion 209 is cured at elevated temperatures and steel portion 203 has a larger coefficient of thermal expansion than composite portion 209, steel portion 203 is in compression about composite portion 209 when at operational temperatures, which are lower than the curing temperatures. In some embodiments, the residual compressive stresses are sufficient to maintain a fixed spatial relationship between composite portion 209 and inner surface 213 of steel portion 203. In other embodiments, however, composite portion 209 is bonded to inner surface 213 of steel portion 203, for example, by bonding of the resin of composite portion 209 to inner surface 213 or by bonding via additional adhesive material, as is discussed in greater detail herein.

In one particular embodiment, however, at least one ply of adhesive film is added to at least a portion of the interface 213 of composite portion 209 and steel portion 203 to enhance the synergy of these two elements of mast 201. Before interior composite portion 209 and mandrel 303 are inserted into steel portion 203, internal surface 213 of steel portion 203 may be selectively treated by suitable processes, such as chemical processes, mechanical processes, thermal processes, and/or combinations thereof, to improve the adhesive bonding and load transfer between interior composite portion 209 and exterior steel portion 203. One example of a chemical process is the preparation of surface 213 of steel portion 203 with a chemical agent, such as phosphate fluoride; the application of an adhesive primer; and the "tackification" of adhesive film onto surface 213. For the purposes of this disclosure, the term "tackification" means lightly sticking the adhesive film onto inner surface 213 of steel portion 203. One example of a mechanical process is the machining of shallow slots or grooves, such as grooves 301, 307, and/or 309 in internal surface 213 of steel portion 203, as shown in FIG. 3. It should be noted that grooves 301, 307, and 309 are merely examples of such grooves that can be defined by internal surface 213 of steel portion 203 and that other groove shapes and geometries exist. Moreover, it should be noted that grooves or slots, such as grooves 301, 307, and/or 309, of steel portion 203 are not required.

Figures 6, 7:
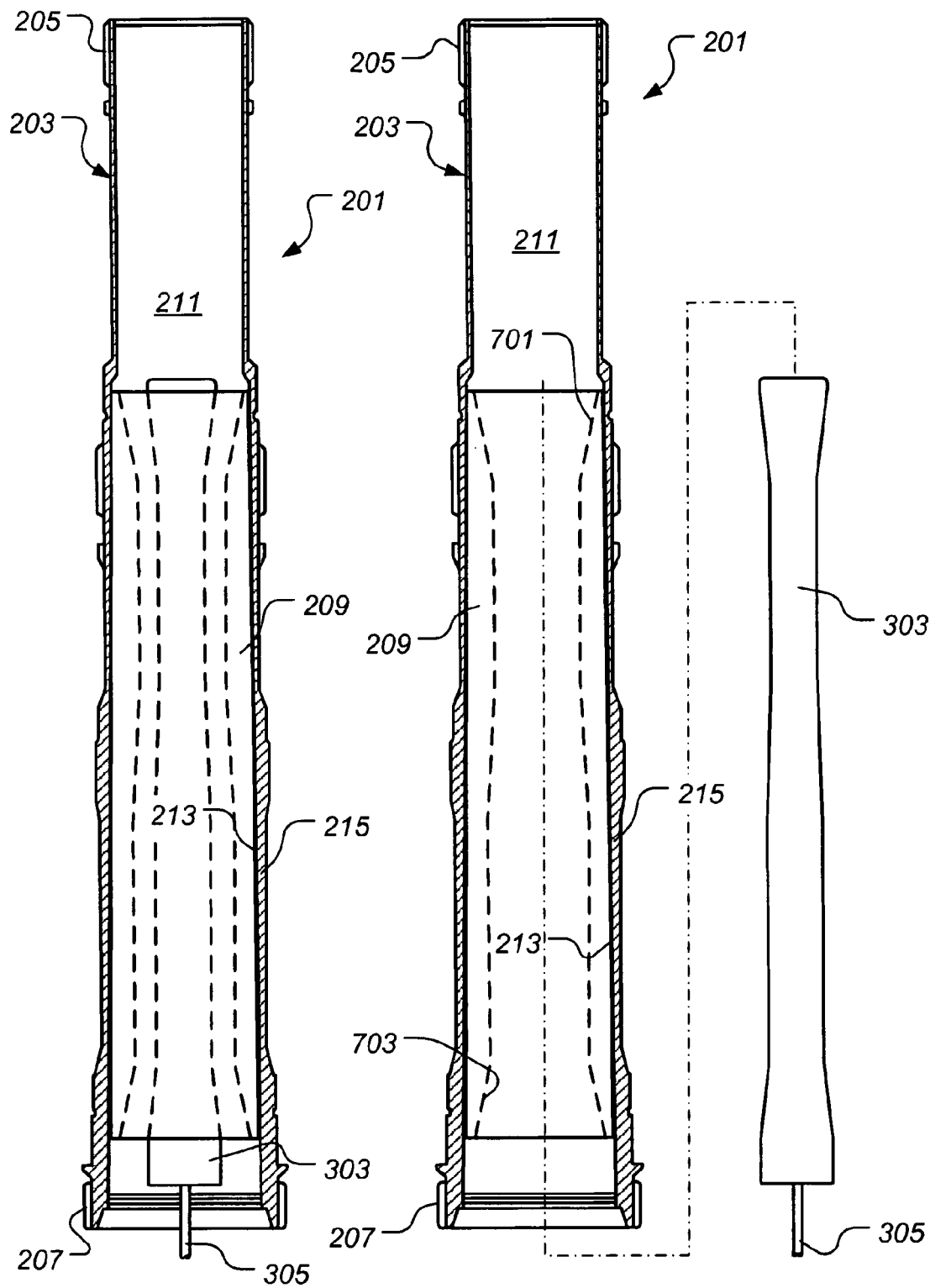

After mast 201 is cured, mandrel 303 is unexpanded or collapsed, as shown in FIG. 6 and removed, as shown in FIG. 7. In one embodiment, mandrel 303 is unexpanded or collapsed by withdrawing the fluid, for example, a gas such as air or nitrogen, from within mandrel 303. Surfaces of mast 201 and/or mandrel 303 are cleaned, as desired.

Figure 8:
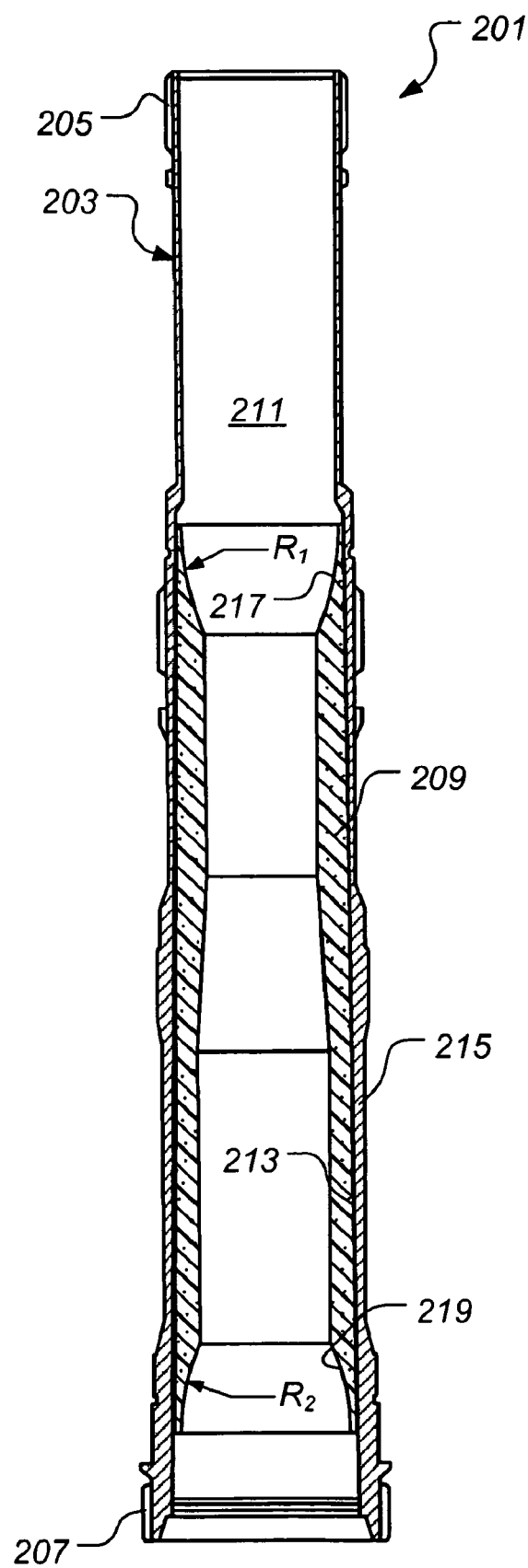
FIG. 8 is a longitudinal, cross-sectional view of an illustrative embodiment of a composite-steel hybrid mast for a rotorcraft, alternative to the embodiment of FIG. 2.

Referring to the embodiment of FIG. 2, end surfaces 217 and 219 of composite portion 209 are tapered. Alternatively, as shown in FIG. 8, end surfaces 217 and 219 are filleted, exhibiting a radius $R_1$ or $R_2$, respectively. If filleted or tapered surfaces 217 and 219 are not produced by expandable mandrel 303 and "molded in," filleted or tapered surfaces 217 and 219 are machined at ends of composite portion 209, if desired. Generally, filleted or tapered surfaces 217 and 219 minimize the interface shear stress caused by torque transition from steel portion 203 into composite portion 209 and from composite portion 209 into steel portion 203 and provide a smooth torque transition. The interface shear stress outside the transition zones is zero, except in the area where the wall thickness of steel portion 303 or composite portion 209 changes, according to the linear theory of strength of materials. The optimal dimension of filleted or tapered surfaces 217 and 219 is implementation specific and preferably tailored through stress analysis. It should be noted, however, that filleted or tapered surfaces, such as surfaces 217 and 219, of composite portion 209 are not required in every embodiment.

The thicknesses and diameters of steel portion 203 and composite portion 209 can be tailored to have the torsional stiffnesses and bending stiffnesses to meet selected dynamics requirements. In one particular embodiment, both composite portion 209 and steel portion 203 carry at least one of lift, thrust, torsion, and bending loads, such that hybrid mast 201 as a whole meets the structural design criteria for static and fatigue. The load distribution among composite portion 209 and steel portion 203 is determined by the respective wall thicknesses and diameters. For example, mast 201 can be designed such that composite portion 209 alone is capable of carrying design limit load which is the maximum obtainable load under a normal operating condition. Therefore, an unexpected crack growth or propagation in steel portion 203 will not propagate into composite portion 209 immediately, thus preventing catastrophic failure. This is a 'fail-safe' feature of steel-composite hybrid mast. This makes mast 201 more reliable and durable than traditional steel masts. Because steel portion 203 is exposed to hostile environments and to most sources of damage, it is likely that any undesirable cracks or other damage will initiate in steel portion 203.

Composite-steel hybrid masts provide dual load paths for any type of rotorcraft, including helicopters and tiltrotor aircraft, both manned and unmanned. Composite-steel hybrid masts allow for optimization of the hybrid design for maximum structural integrity with minimum weight.

The composite-steel hybrid mast has significant advantages, including: (1) the dual load paths, i.e., composite and steel, make the rotor mast more reliable and more durable as opposed to the single load path design of the traditional rotor mast; and (2) the weight of a rotor mast can be reduced depending upon the model of aircraft and the type of application, because of the lighter weight of the composite material.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A composite-steel hybrid mast for a rotorcraft, comprising:
    a tubular, steel portion having an internal surface defining a space therein; and
    a composite portion disposed within the space defined by the internal surface of the steel portion and held in a fixed spatial relationship with respect to the internal surface of the steel portion;
    wherein the composite portion has an internal surface defining a space therein;
    wherein the internal surface of the steel portion defines at least one groove.

2. The composite-steel hybrid mast, according to claim 1, wherein the composite portion includes a fiber-reinforced, polymeric composite material and a polymer of the composite material adhesively bonds the composite portion to the internal surface of the steel portion.

3. The composite-steel hybrid mast, according to claim 1, further comprising:
    an adhesive disposed between the composite portion and the internal surface of the steel portion, such that the adhesive adhesively bonds the composite portion to the internal surface of the steel portion.

4. The composite-steel hybrid mast, according to claim 1, wherein ends of the composite portion are filleted or tapered.

5. The composite-steel hybrid mast, according to claim 1, wherein the steel portion and the composite portion are adapted to carry at least one of lift, thrust, torsion, and bending loads while in use.

6. The composite-steel hybrid mast, according to claim 1, wherein the composite portion is adapted to carry a design limit load.

7. The composite-steel hybrid mast, according to claim 1, wherein the mast is adapted for incorporation into one of a helicopter and a tiltrotor aircraft.

8. A method for making a composite-steel hybrid mast for a rotorcraft, comprising:
    providing a tubular, steel portion comprising an internal surface defining a space therein;
    preparing a composite portion comprising a fiber-reinforced, polymeric, composite material on an expandable mandrel;
    placing the expandable mandrel, with the composite portion thereon, into the space defined by the internal surface of the steel portion;
    expanding the expandable mandrel so the composite portion comes into contact with the internal surface of the steel portion;
    curing the composite portion so that the composite portion is bonded to the steel portion;
    unexpanding the expandable mandrel;
    removing the expandable mandrel from the composite portion and
    machining at least one of a taper and a fillet at an end of the composite portion.

9. The method, according to claim 8, wherein the expandable mandrel comprises:
    an elastomeric material defining a balloon structure.

10. The method, according to claim 8, wherein expanding the expandable mandrel is accomplished by introducing a fluid into the mandrel under pressure.

11. The method, according to claim 10, wherein the fluid is a gas.

12. The method, according to claim 11, wherein the gas is at least one of air and nitrogen.

13. The method, according to claim 10, wherein unexpanding the mandrel is accomplished by withdrawing the fluid from the mandrel.

14. The method, according to claim 8, further comprising:
    treating the internal surface of the tubular, steel portion with a chemical agent to improve adhesive bonding;
    applying an adhesive primer to the internal surface of the tubular, steel portion; and
    applying at least one ply of adhesive film to the internal surface of the tubular, steel portion prior to placing the expandable mandrel and the composite portion into the space defined by the internal surface of the steel portion.

15. The method, according to claim 8, wherein the expandable mandrel comprises:
    a segmented, metallic mandrel.

16. The method, according to claim 15, wherein expanding the expandable mandrel is accomplished by mechanically actuating segments of the segmented, metallic mandrel toward the internal surface of the tubular, steel portion.

* * * * *